FIG. 5
FIG. 6
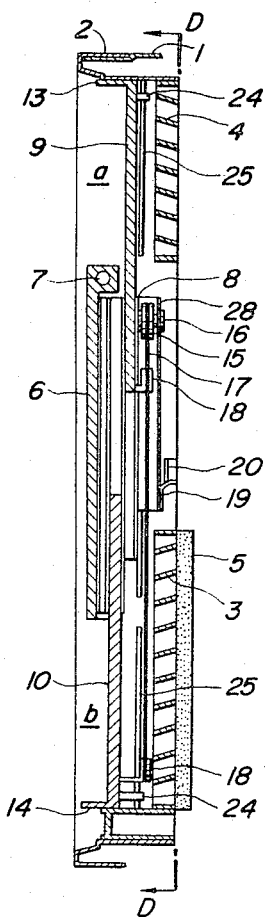
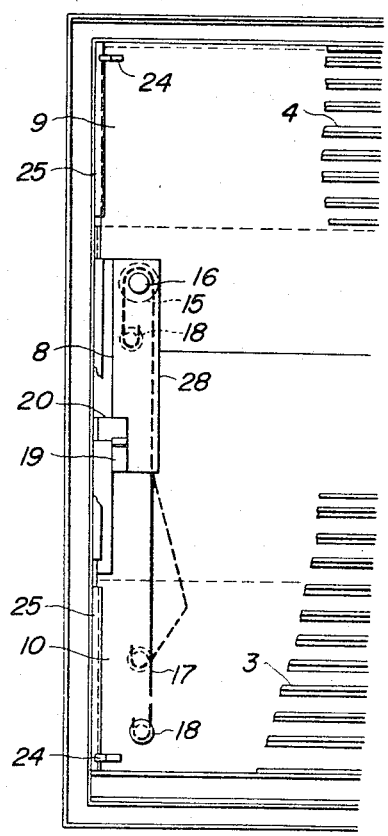

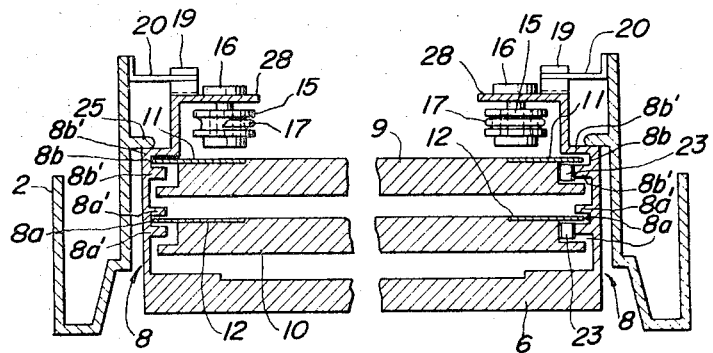
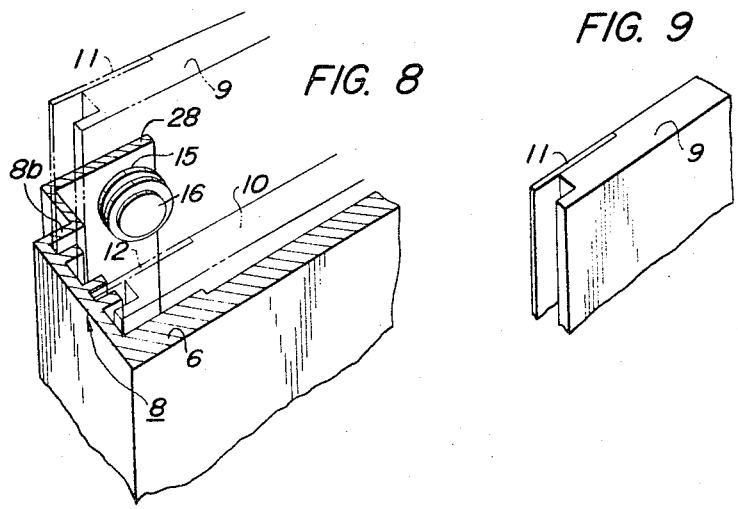

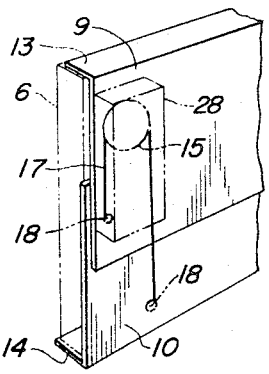
FIG. 10
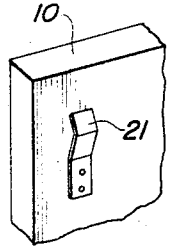
FIG. 11
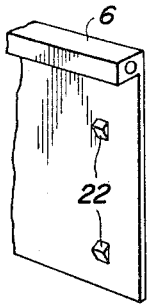
FIG. 12
FIG. 13 FIG. 14
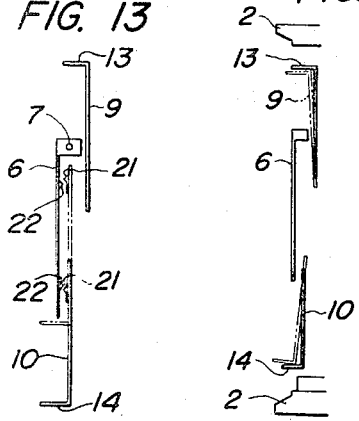
FIG. 15
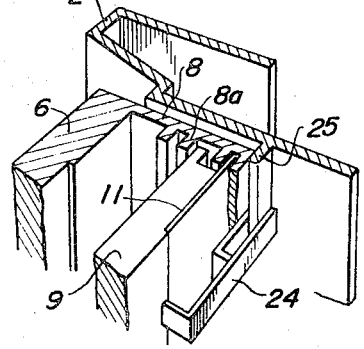

United States Patent Office 3,420,592
Patented Jan. 7, 1969

3,420,592
AIR CONDITIONER
Kyoichi Ogata, Hiroyuki Ogawa, Akio Sakazume, Mitsuo Akiyama and Ukichi Kikuchi, Tochigi-ken, Japan, assignors to Hitachi Ltd., and Keihin Hitachi Engineering Co., Ltd., Tokyo, Japan, both corporations of Japan
Filed May 10, 1967, Ser. No. 637,491
Claims priority, application Japan, June 20, 1966, 41/39,592
U.S. Cl. 312—204       2 Claims
Int. Cl. E05f 17/00; F24f 1/02; F24f 13/14

ABSTRACT OF THE DISCLOSURE

An air conditioner having a decorative frame structure fitted over the front end opening thereof, said decorative frame structure having air passage openings formed therein which are opened or closed simultaneously by means of upper and lower closure panels slidably mounted in said decorative frame structure.

The present invention relates to an air conditioner having fitted on the front open end of the casing thereof a decorative frame structure forming air passage openings.

It is an object of the present invention to provide an air conditioner wherein the air passage openings formed in a decorative frame structure may be closed when the air conditioner is not in operation.

It is another object of this invention to provide an air conditioner wherein air passage openings formed in a decorative frame structure may be closed by a simple operation when the air conditioner is not in operation.

It is still another object of this invention to provide an air conditioner wherein air passage openings formed in a decorative frame structure may be closed in a positive manner when the air conditioner is not in operation.

It is still another object of this invention to provide an air conditioner wherein air passage openings may be closed when the air conditioner is not in operation and wherein adjustment of airflow and mounting or removal of a filter element may be effected with ease.

These and other objects, features and advantages of the present invention will become apparent from the following detailed description when taken in conjunction with the accompanying drawings in which the present invention is illustrated by way of example and in which:

FIG. 5 is a cross section taken along the line C—C of FIG. 2;

FIG. 6 is a view taken along the line D—D of FIG. 5 with portions broken away;

FIG. 7 is a cross section taken along the line E—E of FIG. 1 with portions broken away;

FIG. 8 is a fragmentary perspective view illustrating the junction between a central decorative panel and upper and lower closure panels;

FIG. 9 is a fragmentary perspective view of the upper closure panel;

FIG. 10 is a fragmentary perspective view illustrating the movements of the upper and lower closure panels;

FIGS. 11 and 12 are fragmentary perspective views showing the retainer members on the lower closure panel and the central decorative panel respectively;

FIG. 13 is a schematic view illustrating the retainer members shown in FIGS. 11 and 12 in an engaged position;

FIG. 14 is a schematic view illustrating the upper and lower closure panels closing the outlet and inlet openings;

FIG. 15 is a fragmentary perspective view illustrating the rail member of the upper closure panel in an engaged position;

Figure 3:
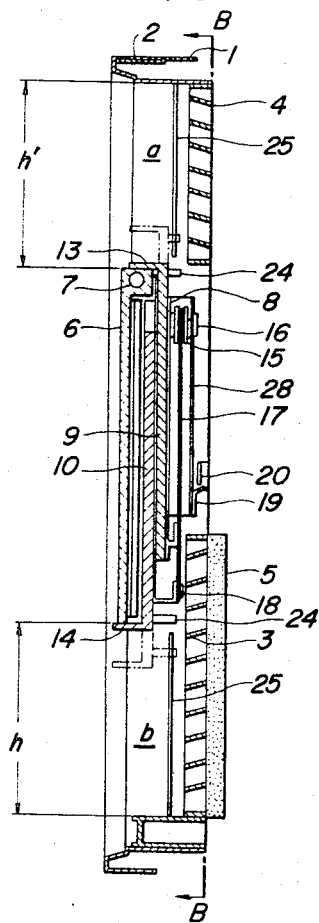
FIG. 3 is a cross section taken along the line A—A of FIG. 1.

Referring to the drawings, a casing 1 of the air conditioner is open at the front end and has a refrigerating cycle and an air blower (both not shown) mounted therein. A decorative frame structure 2 is detachably fitted over the front opening of the casing 1 facing the interior of the room wherein the air conditioner is mounted, and has an inlet grill 3 and an outlet grill 4 fitted in the upper and lower openings therein respectively. The inlet grill 3 and the outlet grill 4 are separated by a central decorative panel 6, so that, when the air conditioner is in operation for cooling or heating the air in the room, the air is sucked in the air conditioner through the inlet grill 3 by the air blower cooled by an evaporator (not shown) and discharged into the room through the outlet grill 4. On the backside of the inlet grill 3 is detachably mounted a dust-removing filter 5 of such material as soft polyurethane foam. This dust-removing filter must be removed and cleaned from time to time because the dust accumulated thereon during use will afford an increasing flow resistance to the air. The central decorative panel 6 arranged between and slightly forwardly of the inlet grill 3 and the outlet grill 4 is pivotally connected at its top edge to the decorative frame structure 2 by means of a pivot pin 7. The lower edge of the central decorative panel 6, as best shown in FIGS. 3 and 5, is extending downwardly to overlap the upper portion of the inlet grill 3. Thus, it will be understood that the amount of air sucked in the air conditioner may be adjusted by swinging the central decorative panel 6 about the pivot pin 7. In this case, it is to be noted that, where the lower edge portion of a lower closure panel 10 to be described hereinbelow also overlaps the upper portion of the inlet grill 3 along with the central decorative panel 6, the central decorative panel 6 must be accompanied by the lower closure panel 10 in its swinging movement. As will be appreciated, the central decorative panel 6 serves to prevent the cooled air being discharged through the outlet grill 4 from being sucked directly into the air conditioner through the inlet grill 3. Extending rearwardly from both ends of the central decorative panel 6 as shown in FIG. 7, are rail members 8, 8 which are either formed integrally with said central decorative panel 6 or connected thereto by means of screws. These rail members 8, 8 may be of any other form, providing that they are connected to the decorative frame structure. Each of the rail members is formed on the interior surface thereof two pairs of ridges 8a', 8a' and 8b', 8b' defining opposite slide grooves 8a and 8b respectively. The rear slide grooves 8b, 8b are preferably located forwardly of the inlet grill 3 and the outlet grill 4, because otherwise sliding plates 11 of an upper closure panel 9 to be described later cannot be formed simply with a flat plate. The upper and lower closure panels 9 and 10, as shown in FIGS. 7 and 9, respectively have a pair of sliding plates 11 and 12 of a wear-proof material, such as metal or resin, attached to the opposite and portions on the backside thereof. These closure panels 9 and 10 are movable vertically to close or open the outlet opening a and inlet opening *b* shown in FIG. 3, with their sliding plates 11 and 12 slidably received in the respective slide grooves 8*a* and 8*b* of the rail members 8. Springs 23, 23 are mounted in one end surfaces of the upper and lower closure panels 9 and 10 for abutment against one of the ridges 8*a*' and 8*b*' respectively, so that the sliding plates 11 and 12 on the other ends of the respectively closure panels may be pressed against the bottoms of the corresponding slide grooves of the rail member with a suitable force. Because of the arrangement described, it will be seen that the upper and lower closure panels 9 and 10 slide vertically positively with a minimum contact resistance and in a uniform contact with the respective rail members without rattling. The upper and lower closure panels 9 and 10 are provided at the upper and lower edges thereof with forwardly projecting stoppers 13 and 14 respectively for abutment against the central decorative panel 6. The stopper 14 of the lower closure panel 10 is projecting forwardly of the central decorative panel 6 so as to provide a hook for sliding movement of said closure panel. Pulleys 15 are rotatably mounted on pins 16 respectively which are provided on the upper portions of the opposite wall sections 28 of the rail members 8, said wall sections being extending towards each other from the rear ends of the respective rail members to provide for connection of the rail members to the decorative frame structure 2. These pulleys 15 may alternatively be mounted on any other member which is connected to the central decorative panel 6 integrally therewith. A wire 17 passes over each of the pulleys 15 and has both ends fixed to the lower edge portions of the upper and lower closure panels 9 and 10 by means of a fitting 18. This wire 17 is maintained in a tense condition. From the arrangement described, it will be seen that both the upper and lower closure panels 9 and 10 are carried on the central decorative panel 6 when they are in an overlapping relation on the backside of said panel 6. When the lower edge of the central decorative panel 6 is pulled forwardly, therefore, it swings about the pivot pin 7 while carrying the upper and lower closure panels 9 and 10 thereon. Designated by reference numeral 19 are retainer springs which are provided at the lower edge portions of the opposite wall sections 28 of the rail members for engagement with corresponding retainer members 20 provided on the decorative panel structure 2.

Figure 1:
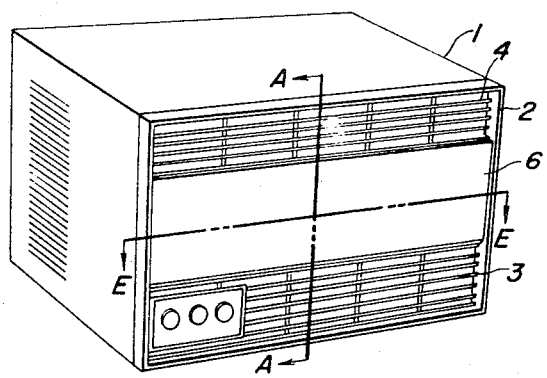
FIG. 1 is a perspective view of an air conditioner according to this invention in an operative position.
Figure 2:
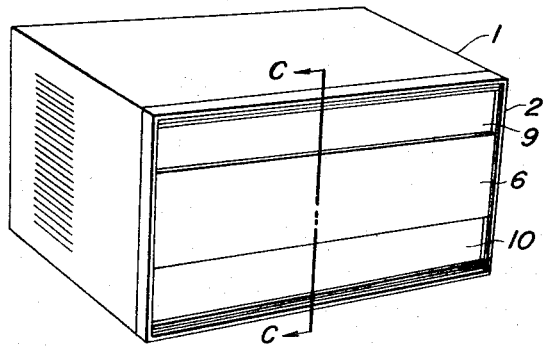
FIG. 2 is a perspective view of the air conditioner shown in FIG. 1 in an inoperative position.
Figure 4:
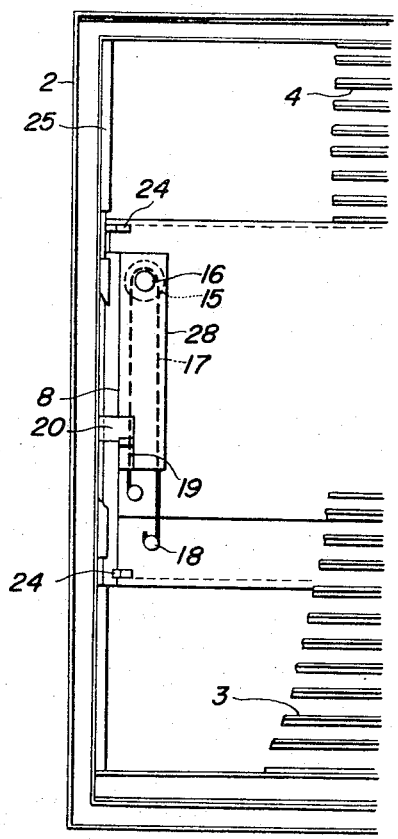
FIG. 4 is a view taken along the line B—B of FIG. 3 with portions broken away.

With the construction described hereinabove, when the decorative frame structure 2 is to be shifted from the opening position shown in FIGS. 1, 3, and 4 to the closing position shown in FIGS. 2, 5 and 6, the stopper 14 of the lower closure panel 10 is first of all depressed downwardly to lower said lower closure panel to the imaginary position shown in FIG. 3. The wires 17 are, therefore, pulled downwardly at one end causing the other end thereof to pull the upper closure panel 9 upwardly into the imaginary position shown in FIG. 3 through the respective pulleys 15. Thus, both the upper and lower closure panels 9 and 10 are moved into their closing positions simultaneously, whereby the outlet opening *a* and the inlet opening *b* are closed by the single action. In this case, it is to be noted that, whereas the distances *h*' and *h* of the upward and downward movements of the upper and lower closure panels 9 and 10 should normally be the same, these distances, if desired, may be made different by the provision of a plurality of pulleys. In the state of the decorative frame structure 2 shown in FIGS. 2, 5 and 6, the air conditioner is completely protected against the dust present in the room, and obviously there is no fear of the dust attaching to the inlet and outlet grills 3 and 4. In addition, the inventive decorative frame structure is highly effective in improving the appearance and design of the air conditioner because the interior of the air conditioner is kept out of sight by said frame structure. Now, when the air conditioner is to be put in service, the lower closure panel 10 is raised upwardly by way of the stopper 14, whereby the upper closure panel 9, which has been pulled upwardly by the wires 17, are moved downwardly under the gravity. In the manner described, both the upper and lower closure panels 9 and 10 are moved into the overlapping positions simultaneously, opening the outlet opening *a* and the inlet opening *b*, as shown in FIGS. 1, 3 and 4. In this state of the decorative frame structure, air in the room is sucked into the air conditioner through the inlet grill 3 and discharged through the outlet grill 4 after having been cooled or heated by said air conditioner, as in the case of conventional air conditioners, and thereby the air in the room is cooled or heated. As will be seen from the foregoing description, the inventive decorative frame structure is highly convenient in that the outlet and inlet openings may be opened or closed all at once by a simple and single operation, owing to such arrangement that the upper and lower closure panels 9 and 10 are operatively connected with each other.

In the case where the weights of the upper and lower closure panels 9 and 10 are not the same, it is impossible to keep the outlet and inlet openings *a* and *b* closed when the upper closure panel 9 is heavier than the lower closure panel 10, because the upper closure panel 9 lowers spontaneously under the gravity causing the lower closure panel to move upwardly, or to keep the outlet and inlet openings open when the lower closure panel 10 is heavier than the upper closure panel 9, because the lower closure panel lowers spontaneously under the gravity causing the upper closure panel to move upwardly. Although such spontaneous vertical movements of the closure panels may be prevented to some extent by the resiliency of the springs 23, the springs alone are not sufficient to prevent possible unintentional vertical movements of the closure panels as caused by vibration of the decorative frame structure during the operation of the air conditioner or swinging movement of the same as will be described later. In order to avoid such occurrence, the retainer springs 21 are provided on the opposite ends in the upper edge portion of the lower closure panel 10 as shown in FIG. 11, for engagement with corresponding retainer members 22 provided on the upper and lower edge portions on the backside of the central decorative panel 6 as shown in FIG. 12. The retainer springs 21 engage the corresponding retainer members 22 in the lower edge portion of the panel 6 in the manner shown in FIG. 13 when the lower closure panel 10 closes the inlet opening *b*, whereas they engage the corresponding retainer members 22 in the upper edge portion of the panel 6 in the manner shown in FIG. 13 when the lower closure panel 10 is in the elevated position opening the inlet opening *b*. Thus, it is possible to avoid the spontaneous vertical movement of the upper and lower closure panels 9 and 10 described previously. As will be appreciated, the operation of the closure panels may be eased by making the weight of the lower closure panel 10 slightly heavier than that of the upper closure panel 9.

Figure 16:
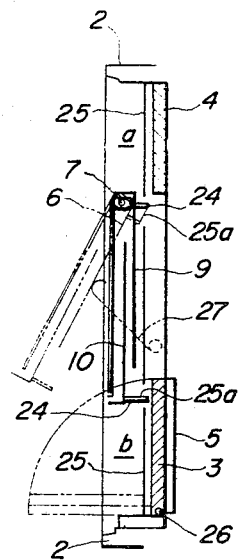
FIG. 16 is a cross section illustrating the swinging motions of the central decorative panel and the inlet grill.

The resiliency of the springs 23 should be so adjusted as to make the contact resistance between the upper closure panel 9 and the rail member reasonably small because, if the contact resistance is excessively large, the upper closure panel 9 would not move downwardly even when the lower closure panel 10 is raised, the result being only that the wire 17 is flexed in the state indicated by the imaginary line in FIG. 6. In the closing position, the upper and lower closure panels 9 and 10 tend to rattle fore-and-aft due to a reduced engagement between the sliding plates 11 and 12 of the respective closure panels and the associating slide grooves 8*a* and 8*b* of the rail members as shown in FIG. 14. As a result, the contact resistance becomes large. In order to deal with this problem, guide members 24 are provided on the backsides of the upper and lower closure panels 9 and 10 as shown in FIGS. 3 to 6 and 15 for engagement with corresponding ridges 25 formed on the inner surfaces of the side walls of the decorative frame structure 2. By so doing, the rattling of said closure panels is prevented. This ridge 25 is partly broken away so as to provide for swinging movement of the upper or lower closure panel along with the central decorative panel 6. In the open position of the decorative frame structure, that is, the operative position of the air conditioner, the upper and lower closure panels 9 and 10 are placed in an overlapping position behind the central decorative panel 6 to be integrated therewith, so that the central decorative panel may be swung about the pivot pin 7 as shown in FIG. 16. The cooling capacity of the air conditioner may be adjusted by the adjustment of the area of the inlet opening b for the passage of air and such an adjustment is possible by holding the central decorative panel 6 in the desired inclined position by means of a support spring 27 in the manner shown in FIG. 16. In this case, the airflow passing through the inlet opening b may be varied stepwise by providing means adapted to change the inclination of the central decorative panel 6 stepwise. It is also to be noted that, by arranging the inlet grill 3 so as to make a pivotal movement about a pin 26 provided at the lower edge portion thereof, it is possible to readily remove the filter element 5 without necessitating the detachment of the decorative frame structure 2 from the casing 1.

Figure 17:
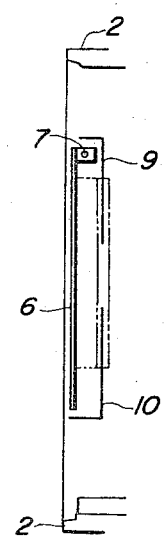
FIG. 17 is a schematic cross section illustrating another embodiment of the invention.

Although in the embodiment described herein, the upper and lower closure panels 9 and 10 are arranged to slide in the two sliding grooves 8a and 8b as the sliding distances h' and h are relatively large, they may be arranged to slide in a single groove as shown in FIG. 17, with no substantial change in the effect of the inventive frame structure set forth above, where said distances are relatively small.

What is claimed is:

1. An air conditioner comprising a casing having the front end open and accommodating operational elements therein, a decorative frame structure fitted over said opening, a central decorative panel arranged in the central portion of said decorative frame structure, upper and lower closure panels having both ends vertically slidably received in slide grooves formed in said central decorative panel, pulleys rotatably mounted on said central decorative panel, and wires passing over said respective pulleys and having both ends connected to said upper and lower closure panels for operatively connecting said closure panels with each other.

2. An air conditioner comprising a casing having the front end open and accommodating operational elements therein, a decorative frame structure fitted over said opening, a central decorative panel pivotally connected to the central portion of said decorative frame structure for swinging movement, upper and lower closure panels slidably received in slide grooves formed in said central decorative panel, pulleys rotatably mounted on said central decorative panel, and wires passing over said respective pulleys and having both ends connected to said upper and lower closure panels for operatively connecting said closure panels with each other.

References Cited

UNITED STATES PATENTS

| 2,939,450 | 7/1960 | Rubens | 49—121 X |
| 3,306,069 | 2/1967 | Wegman | 62—262 |
| 3,323,319 | 6/1967 | Graser | 62—262 |

CASMIR A. NUNBERG, *Primary Examiner.*